United States Patent
Zhang et al.

(10) Patent No.: US 10,055,033 B2
(45) Date of Patent: Aug. 21, 2018

(54) ACTIVE CAPACITIVE PEN, AND TOUCH DETECTION AND FEEDBACK DRIVING METHODS THEREFOR

(71) Applicants: SHANGHAI YISHANG INFORMATION TECHNOLOGY CO., LTD., Shanghai (CN); IPEN TECHNOLOGY LIMITED, Hong Kong (CN)

(72) Inventors: Jianfeng Zhang, Hong Kong (CN); Xitian Zhou, Hong Kong (CN)

(73) Assignees: SHANGHAI YISHANG INFORMATION TECHNOLOGY CO., LTD., Shanghai (CN); IPEN TECHNOLOGY LIMITED, Hong Kong (CN)

( * ) Notice: Subject to any disclaimer, the term of this patent is extended or adjusted under 35 U.S.C. 154(b) by 84 days.

(21) Appl. No.: 15/104,832

(22) PCT Filed: Dec. 23, 2013

(86) PCT No.: PCT/CN2013/090238
§ 371 (c)(1),
(2) Date: Jun. 15, 2016

(87) PCT Pub. No.: WO2015/096007
PCT Pub. Date: Jul. 2, 2015

(65) Prior Publication Data
US 2017/0003768 A1    Jan. 5, 2017

(51) Int. Cl.
*G06F 3/045*    (2006.01)
*G06F 3/0354*    (2013.01)
(Continued)

(52) U.S. Cl.
CPC ........ *G06F 3/03545* (2013.01); *G06F 3/0383* (2013.01); *G06F 3/044* (2013.01); *G06F 3/0416* (2013.01); *G06F 2203/04104* (2013.01)

(58) Field of Classification Search
CPC .. G06F 3/03545; G06F 3/0383; G06F 3/0416; G06F 3/044; G06F 2203/04104
(Continued)

(56) References Cited

U.S. PATENT DOCUMENTS

2010/0170726 A1* 7/2010 Yeh ................. G06F 3/03545
                                                        178/19.03
2012/0154340 A1   6/2012 Vuppu et al.
(Continued)

FOREIGN PATENT DOCUMENTS

| CN | 102087565 A | 6/2011 |
| CN | 103729073 A | 4/2014 |
| CN | 203673444 U | 6/2014 |

*Primary Examiner* — Mark Regn
(74) *Attorney, Agent, or Firm* — Muncy, Geissler, Olds & Lowe, P.C.

(57) ABSTRACT

An active capacitive stylus and methods for touch detection and feedback actuation thereof are disclosed. The active capacitive stylus includes a conductive tip, a signal processing module and a capacitor. The conductive tip is configured to detect a touch-screen actuation signal emitted from a touch screen and to transfer a feedback actuation signal output from the signal processing module. The signal processing module is configured to process the touch-screen actuation signal received by the conductive tip and to synchronously produce the feedback actuation signal. The capacitor is disposed between the conductive tip and the signal processing module and is configured to couple the touch-screen actuation signal obtained by the conductive tip to an input of the signal processing module during the detection and to isolate the feedback actuation signal during the feedback actuation. It is achievable to accurately deter-
(Continued)

mine the position of the conductive tip of the active capacitive stylus.

2 Claims, 6 Drawing Sheets

(51) Int. Cl.
*G06F 3/044* (2006.01)
*G06F 3/038* (2013.01)
*G06F 3/041* (2006.01)

(58) Field of Classification Search
USPC .......................................................... 345/174
See application file for complete search history.

(56) References Cited

U.S. PATENT DOCUMENTS

2013/0002606 A1    1/2013  Mann
2013/0207926 A1*   8/2013  Kremin ................. G06F 3/0383
                                                            345/174

* cited by examiner

ACTIVE CAPACITIVE PEN, AND TOUCH DETECTION AND FEEDBACK DRIVING METHODS THEREFOR

TECHNICAL FIELD

The present invention relates to input devices for use with touch screens and, more particularly, to an active capacitive stylus and methods for touch detection and feedback actuation thereof.

BACKGROUND

With the development and progress of science and technology, users are imposing stricter requirements on input methods employed by their cell phones and tablet computers. They have been unsatisfied with the traditional keyboard-based input modes, and are gradually turning to the more convenient touch-based ones. The existing commercially available touch input devices are mostly resistive and capacitive products. With their advantages in higher sensitivity, and since it is easier for them to provide multi-touch functions, capacitive touch screens are gradually replacing their resistive touch screen counterparts and predominating the market. There are two kinds of capacitive touch screens, the surface capacitive type and projected capacitive type, and the projected capacitive type can be further categorized into mutual-capacitive and self-capacitive types. A touch screen of the mutual-capacitive type includes two arrays of electrodes, arranged orthogonal to each other, and a touch screen controller. One of the electrode arrays serves as actuation electrodes, and the other as detection electrodes. The electrodes form mutual capacitances with those of the other array or form self-capacitances with a ground. Under the effect of an actuation module, the actuation electrodes produce touch-screen actuation signals, which are received by the detection electrodes. Upon a grounded conductive object (e.g., a finger) approaching the capacitive touch screen, the mutual capacitances between the actuation and detection electrodes will vary, and by detecting the mutual capacitance variations, the detection electrodes are capable of determining the location of the touch point. In contrast, a self-capacitive touch screen has electrodes functioning as both actuation and detection electrodes. The touch screen controller actuates one of the electrodes and determines whether there is a grounded conductive object in its vicinity by detecting a change in the capacitance of the one of the electrodes. A surface capacitive touch screen has four electrodes projecting from its respective corners and works basically in a similar way as above, i.e., detecting the location of a touch point from capacitance variations caused by the approaching of a conductive object.

Depending on whether they are electrically powered, touch screen styluses are grouped into passive and active ones. A passive stylus simply mimics a human finger by means of a conductive object (e.g., a conductor or conductive rubber, etc.) which forms a capacitance between its tip and conductive touch screen actuation, thus altering the detection results of the touch screen. Such a passive styluses is, however, disadvantageous in having a relative bulky tip (usually greater than 2 mm).

Active capacitive styluses include a signal processing module disposed therein for actively detecting a touch-screen actuation signal, as well as a conductive tip which can be made as thin as an oscilloscope probe and is capable of coupling a signal into the signal processing module in the active capacitive stylus for further processing and outputting. Active capacitive styluses can also be divided into two groups, Electro-Magnetic Resonance (EMR) and active capacitive styluses. In order to enable an EMR stylus to provide writing functions, the touch screen is required to have additional hardware such as an EMR screen layer or a sensor layer. This additional hardware not only leads to increases in thickness, cost and industrial design inferiority, but also makes the stylus unable to be used with the existing commercially available products that are equipped with only traditional touch screens. On the contrary, active capacitive styluses do not need the EMR screen layer or the sensor layer that increases screen thickness and can be directly used with the existing commercially available touch screens.

U.S. Pub. Nos. US20120154340 and US20130002606 each disclose an active capacitive stylus designed to have separate detection and actuation electrodes. These styluses are, however, associated with shortcomings described as follows:

One of the shortcomings is that both the active capacitive styluses disclosed respectively in U.S. Pub. Nos. US20120154340 and US20130002606 are configured to generate a feedback actuation signal from a bulky stylus tip or a stylus body that is spaced apart from the touch screen by a rather distance, which will make the feedback actuation signal, in case of a human user holding the stylus body in a titled orientation with respect to the touch screen just in the same way as most persons customarily do when writing with a stylus, have an intensity distribution on the touch screen that is not centered at the tip but is concentrated on the side of the screen nearer to the stylus body. This deviation is unable to be corrected by a subsequent algorithm because the touch screen controller or the host has no idea of the tilt slope of the stylus body of the active capacitive stylus.

Another shortcoming is that in the design of the U.S. Pub. Nos. US20120154340 and US20130002606 in which the detection and actuation electrodes are separated from each other and the detection and feedback actuation are carried out in a synchronous manner. So, if an inadequate isolation is provided between the electrodes, a generated actuation signal will be coupled into the detection electrodes and cause oscillation.

SUMMARY OF THE INVENTION

It is an objective of the present invention to overcome the above-described shortcomings of the prior art by providing an active capacitive stylus and a method for its touch detection and feedback actuation which not only allows accurate positioning of a conductive tip of the active capacitive stylus but can also easily identify whether a conductive object is a finger or the active capacitive stylus.

It is another objective of the present invention to provide an active capacitive stylus capable of delivering feedback actuation signals of different strengths according to settings, and a method for touch detection and feedback actuation thereof.

These and other objectives are attained by an active capacitive stylus according to one preferred embodiment of the present invention, including a conductive tip, a signal processing module and a capacitor. The conductive tip is configured to detect a touch-screen actuation signal from a touch screen and to transfer a feedback actuation signal output from the signal processing module. The signal processing module is configured to process the touch-screen actuation signal received by the conductive tip and to synchronously produce the feedback actuation signal. The capacitor is disposed between the conductive tip and the signal processing module and configured to couple the touch-screen actuation signal obtained by the conductive tip into an input of the signal processing module during the detection and to isolate the feedback actuation signal during the feedback actuation of the touch screen.

Additionally, the signal processing module may include:

a detection circuitry, configured to detect an ascending or descending edge of the touch-screen actuation signal from the touch screen;

a control circuitry, configured to control the signal processing module to switch from a detection state to a feedback actuation state in response to the detection circuitry having detected the ascending or descending edge of the touch-screen actuation signal from the touch screen and to adjust a start time and an end time of the feedback actuation signal, a delay of an ascending or a descending edge of the feedback actuation signal or a voltage of the feedback actuation signal, according to settings such that the feedback actuation signal ends prior to arrival of an ascending or descending edge of a next touch-screen actuation signal, thereby causing the signal processing module to switch from the feedback actuation state again to the detection state; and a feedback actuation circuitry, configured to provide a tri-stated high impedance output during the detection for floating the conductive tip and to transfer the feedback actuation signal to the conductive tip under control of the control circuitry during the actuation so as to enable feedback actuation of the touch screen.

Additionally, the signal processing module may further include a protective circuitry consisting of two or more diodes connected in opposing parallel relation, the protective circuitry has a first end coupled to a constant bias voltage and a second end coupled to the input of the detection circuitry.

Additionally, the active capacitive stylus may further include an auxiliary detection electrode disposed at the input of the signal processing module and configured to increase an ability of the active capacitive stylus to detect the touch-screen actuation signal.

These and other objectives are also attained by a method for touch detection and feedback actuation of an active capacitive stylus, including the steps of:

step 1: the active capacitive stylus detecting a touch-screen actuation signal from a touch screen using a detection electrode during a detection phase of a detection and feedback actuation cycle; and step 2: upon detection of the touch-screen actuation signal, the active capacitive stylus entering a feedback actuation phase of the detection and feedback actuation cycle and delivering a feedback actuation signal toward the touch screen using an actuation electrode, wherein a strength of the feedback actuation signal is adjustable by modifying a start time and an end time of the feedback actuation signal, a delay of an ascending or a descending edge of the feedback actuation signal or a voltage of the feedback actuation signal, or by modifying a delay of an ascending edge relative to a descending edge or a delay of a descending edge relative to an ascending edge, in a same detection and feedback actuation cycle, wherein the feedback actuation phase ends before an ascending or descending edge of a next touch-screen actuation signal, and wherein an output of a detection circuitry of the active capacitive stylus is ignored during the feedback actuation phase.

These and other objectives are also attained by another method for touch detection and feedback actuation of an active capacitive stylus, including the steps of:

step 1: the active capacitive stylus detecting a touch-screen actuation signal from a touch screen using a detection electrode during a detection phase of a detection and feedback actuation cycle; and step 2: upon detection of the touch-screen actuation signal, the active capacitive stylus entering a feedback actuation phase of the detection and feedback actuation cycle and delivering a feedback actuation signal toward the touch screen using an actuation electrode, wherein: the feedback actuation signal comprises a single ascending or descending edge having a reverse phase with respect to, or a same phase as, the touch-screen actuation signal, or comprises N ascending or descending edges having a same phase as the touch-screen actuation signal and N+1 ascending or descending edges having a reverse phase with respect to the touch-screen actuation signal, or comprises N ascending or descending edges having a reverse phase with respect to the touch-screen actuation signal and N+1 ascending or descending edges having a same phase of the touch-screen actuation signal, where N is a natural number; the feedback actuation phase ends before an ascending or descending edge of a next touch-screen actuation signal, and an output of a detection circuitry of the active capacitive stylus is ignored during the feedback actuation phase.

Additionally, in case of the feedback actuation signal including more than one ascending or descending edge in a single detection and feedback actuation cycle, a strength of the feedback actuation signal is adjustable by modifying a delay of an ascending edge relative to a descending edge or a delay of a descending edge relative to an ascending edge.

In another preferred embodiment of the present invention, an active capacitive stylus is provided, including a detection electrode, an actuation electrode and a signal processing module, the detection electrode configured to sense a touch-screen actuation signal from a touch screen and to transfer the touch-screen actuation signal to the signal processing module, the signal processing module configured to process the touch-screen actuation signal received by the detection electrode and to synchronously produce a feedback actuation signal, the feedback actuation signal transmitted by the actuation electrode toward the touch screen so as to achieve accurate position determination with an aid of a position determination algorithm deployed in the touch screen, the actuation electrode implemented as a conductive tip, the detection electrode implemented as a conductive head, a conductive body, a conductive metal wire, or a printed circuit board trace.

Compared with the prior art, the active capacitive stylus and method for its touch detection and actuation according to the present invention effectively prevent the signal processing module from forming a closed loop which may cause self-excited oscillation therein, by separating the detection circuitry from the feedback actuation circuitry in terms of temporal sequence. Therefore, the position of the conductive tip of the active capacitive stylus can be accurately determined, and it is more easily identifiable whether the conductive object is a finger or the active capacitive stylus. Meanwhile, the active capacitive stylus according to the present invention further enables delivery of feedback actuation signals of different strengths according to settings.

DETAILED DESCRIPTION

Embodiments of the present invention will be described below with reference to particular specific examples thereof which are to be read in conjunction with the accompanying drawings. Other advantages and benefits of the invention will be readily understood by one of ordinary skill in the art from the disclosure of this specification. In addition, the present invention can be implemented or utilized in the form of other different specific embodiments, and various modifications and variations can be made to details of the specification according to different points of view or applications without departing from the spirit of the invention.

Figure 1:
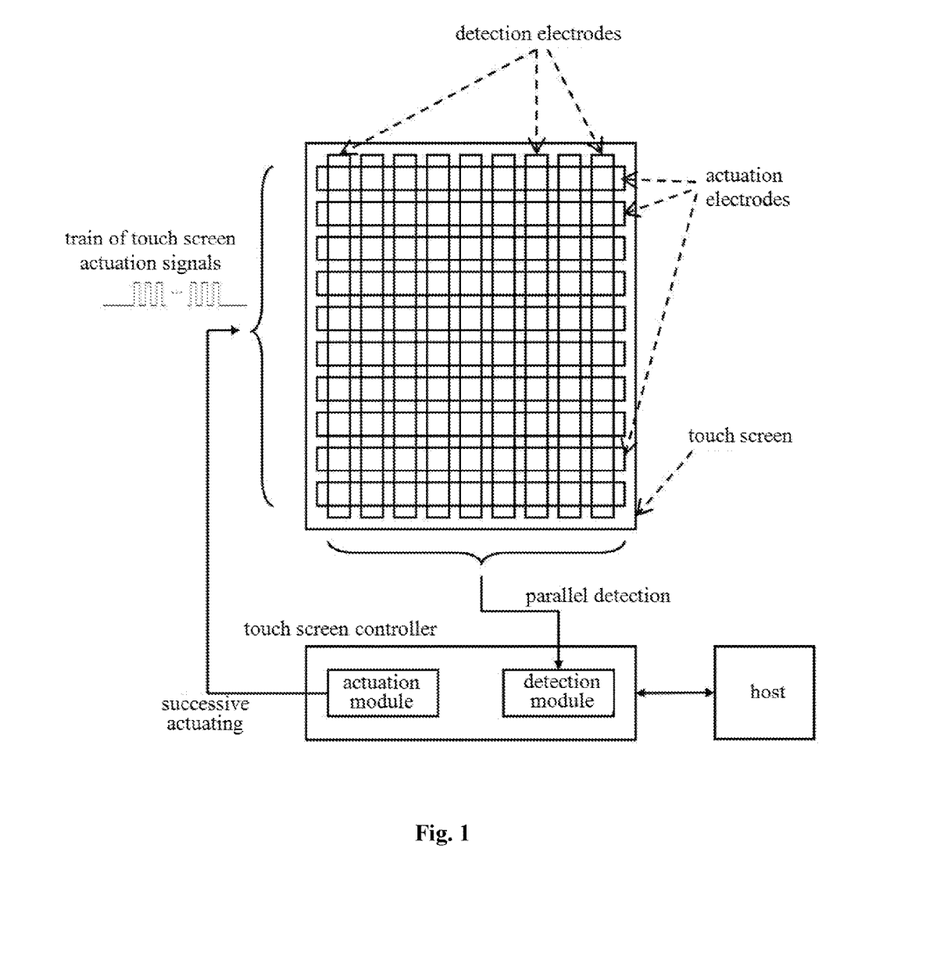
FIG. 1 is a schematic illustration of a commonly-used touch screen system.

Before describing the present invention, a brief introduction is set forth below to explain how a touch screen works. FIG. 1 is a schematic illustration of a commonly-used touch screen system. The touch screen system includes a touch screen, a touch screen controller and a host. The touch screen has a plurality of conductive traces running in an X direction and another plurality of conductive traces running in a Y direction that is usually orthogonal to the X direction. The intersections between the conductive traces extending in the X and Y directions form an array of mutual capacitors. In response to an equivalent grounded conductive object such as, for example, a human finger, approaching or coming into contact with the touch screen, capacitances of mutual capacitors in the vicinity of the conductive object vary. By detecting the variations exhibited by each of the mutual capacitors, the location of the equivalent grounded conductive object on the touch screen can be calculated using an algorithm.

The present invention is applicable to both mutual-capacitive and self-capacitive touch screens. With a mutual-capacitive touch screen as an example, a touch screen controller of the mutual-capacitive touch screen may generate touch-screen actuation signals for actuating its actuation electrodes in a successive manner. The actuation electrodes may be either the X- or Y-directional conductive traces, and the touch-screen actuation signals may be trains of pulses, trains of sinusoidal or triangular waves, or the like (FIG. 1 shows the waveform of only one train of pulses). A train of pulses may include a plurality of pulses. The unactuated conductive traces running in the other direction each serve as a detection electrode. For any one of the actuation electrodes actuated by the touch screen controller, the actuation signal is coupled to the corresponding detection electrodes via the mutual capacitors between the actuation electrode and the detection electrodes. When a conductive object approaches or comes into contact with the actuation electrode and one of the detection electrodes, the capacitance of the corresponding mutual capacitor between the actuation electrode and the one of the detection electrodes will be changed. The touch screen controller detects the capacitances exhibited by everyone of the mutual capacitors and portrays the capacitance variations by comparing the detected values with those measured before the conductive object approached or came into contact. This portrayal of capacitance variations may be transferred to the host which can subsequently calculate the position of the conductive object using an algorithm.

Figure 2:
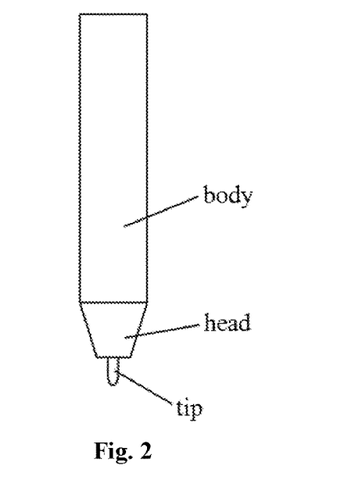
FIG. 2 is an overall schematic illustrating an active capacitive stylus according to the present invention.
Figure 3:
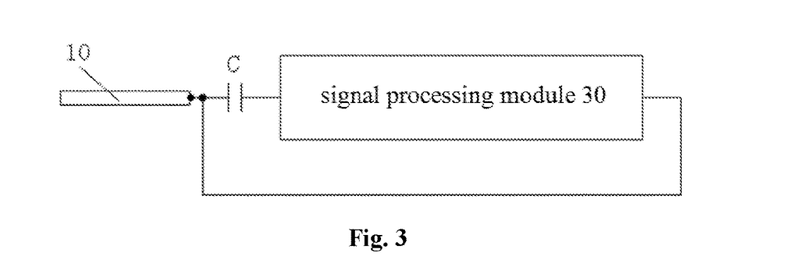
FIG. 3 schematically shows a first preferred embodiment of the active capacitive stylus according to the present invention.
Figure 4:
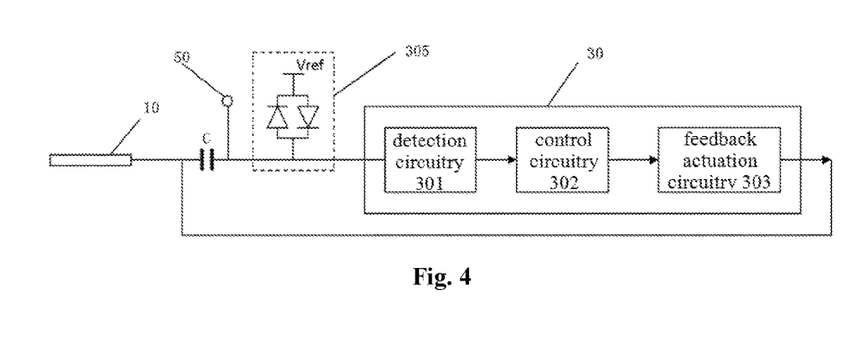
FIG. 4 shows the basic architecture of a signal processing module in the first preferred embodiment of the present invention.

FIG. 2 is an overall schematic illustrating an active capacitive stylus according to the present invention. As illustrated in FIG. 2, the active capacitive stylus according to the present invention includes a tip, a head and a body. FIG. 3 schematically shows a first preferred embodiment of the active capacitive stylus according to the present invention, and FIG. 4 shows the basic architecture of a signal processing module in the first preferred embodiment of the present invention. As shown in FIGS. 3 and 4, the active capacitive stylus according to the present invention includes at least, additional to a power supply unit (which is a battery, according to one preferred embodiment of the present invention), a conductive tip 10, a stylus body, as well as a signal processing module 30 and a capacitor C disposed inside the stylus body.

The conductive tip 10 is connected to the stylus body by means of a mechanical contact and is configured to be used to tap a location of interest on the touch screen and to couple a touch-screen actuation signal from the touch screen and transfer a feedback actuation signal output from the signal processing module 30, i.e., the conductive tip acts as both detection and actuation electrodes. The signal processing module 30 is configured to process the touch-screen actuation signal received by the conductive tip 10 and to synchronously produce a feedback actuation signal. It receives the touch-screen actuation signal at a detection phase and transfers the feedback actuation signal produced from the processing at an actuation phase. The capacitor C is disposed between the conductive tip 10 and the signal processing module 30. The capacitor C is configured to couple the touch-screen actuation signal obtained at the conductive tip 10 to an input of the signal processing module 30 during the detection phase, and to isolate the feedback actuation signal during the feedback actuation of the touch screen.

The signal processing module 30 includes detection circuitry 301, control circuitry 302 and feedback actuation circuitry 303. The detection circuitry 301 is configured to detect an ascending or descending edge of the touch-screen actuation signal from the touch screen. The control circuitry 302 is configured to control the signal processing module to switch from a detection state to a feedback actuation state in response to the detection circuitry 301 having detected the ascending or descending edge of the touch-screen actuation signal from the touch screen and to adjust the start time and end time of the feedback actuation signal, a delay of the ascending or descending edge of the feedback actuation signal or a voltage of the feedback actuation signal according to settings such that the feedback actuation signal ends prior to the arrival of an ascending or descending edge of the next touch-screen actuation signal, thereby causing the signal processing module 30 to switch from the feedback actuation state again to the detection state. The feedback actuation circuitry 303 is configured to provide, during the detection, a tri-stated high impedance output for floating the conductive tip 10 and to transfer, under the control of the control circuitry 302 during the actuation, the feedback actuation signal to the conductive tip 10 so as to enable the feedback actuation of the touch screen.

In operation, the touch screen controller may successively scan the actuation electrodes of the touch screen one by one. During the scanning of each one of the actuation electrodes of the touch screen, the controller may deliver a train of pulses to the actuation electrode of the touch screen. The conductive tip 10 of the active capacitive stylus may form a coupling capacitor with each detection electrode of the touch screen. The closer the conductive tip is located with respect to the actuation electrode of the touch screen, the greater the capacitance of a capacitor formed by the conductive tip and a corresponding detection electrode of the touch screen. Upon the touch screen controller scanning an actuation electrode in the vicinity of the conductive tip 10, the conductive tip 10 is able to couple a touch-screen actuation signal with a sufficient strength. This signal may be coupled to the input of the signal processing module 30 in the active capacitive stylus via the capacitor C. The signal processing module 30 may then modify the strength of the feedback actuation signal according to the settings. The feedback actuation signal of the active capacitive stylus may be coupled to a corresponding detection electrode of the touch screen via a coupling capacitor formed by the conductive tip 10 and the detection electrode. In order for the feedback actuation signal to be coupled to the detection electrode of the touch screen to have sufficient strength, the feedback actuation signal may sometimes have a high voltage of, for example, 15 V, and the capacitor C may accordingly be able to withstand a voltage of 15 V. In FIG. 3, the capacitor C may be disposed either inside the chip or external to the chip. Since the capacitor is not able to isolate an alternating signal, the voltage at the other side of the capacitor, i.e., the input of the signal processing module 30, increases with the voltage at the conductive tip. In order to prevent breakdown of the input of the signal processing module at an excessively high voltage, in a preferred embodiment of the present invention, the input of the signal processing module 30 is additionally provided with a protective circuit 305 which may consist of two or more diodes connected in opposing parallel relation. Each of the diodes may be coupled at one end to a constant bias voltage Vref which is typically set to about one half of an analog power supply voltage (e.g., about 2.5±1.5 V in case of the power supply voltage of 5 V) and at the other end to the input of the detection circuitry 301, so that even when the feedback actuation signal has a very high voltage, the voltage at the input of the detection circuitry 301 will be limited to Vref±Vd, where Vd is a threshold voltage of the diodes. Additionally, in order to facilitate the active capacitive stylus in detecting the touch-screen actuation signal, the input of the detection circuitry 301 may be optionally further provided with an auxiliary detection electrode 50 which may be implemented as a conductive head, a conductive body, a printed circuit board (PCB) trace, or a conductive metal wire.

A description will be presented below to explain in detail how the signal processing module works. In the detection state of the signal processing module 30, the detection circuitry 301 may detect the voltage at the input of the signal processing module 30. Upon detection of an ascending or descending edge of a touch-screen actuation signal, the detection circuitry 301 may output a signal to the control circuitry 302. Additionally, when the signal processing module 30 is in the detection state, the feedback actuation circuitry 303 may provide a high impedance output which floats the conductive tip 10 and hence allows the conductive tip 10 to couple the actuation signal from the touch screen.

Upon receiving the output from the detection circuitry 301, the control circuitry 302 of the active capacitive stylus may control the signal processing module 30 to switch to the feedback actuation state, in which state, the output from the detection circuitry 301 may be ignored by the control circuitry 302, the feedback actuation circuitry 303 may end its high impedance output, and the control circuitry 302 may modify the strength of the feedback actuation signal according to the settings. In a preferred embodiment of the present invention, strength modification for the feedback actuation signal by the control circuitry 302 may be effectuated by altering the start time and end time of the feedback actuation signal, a delay of the ascending or descending edge of the feedback actuation signal, or a voltage of the actuation signal, or by altering a delay of an ascending edge relative to a descending edge or a delay of a descending edge relative to an ascending edge. In this way, the feedback actuation by the active capacitive stylus will end before the arrival of the next touch-screen actuation signal, thereby causing the signal processing module 30 to switch back to the detection state.

A complete active capacitive stylus should be able to allow the touch screen to accurately determine the position of the conductive tip on the touch screen and identify whether the conductive object is a capacitive stylus or a finger.

Figure 5A:
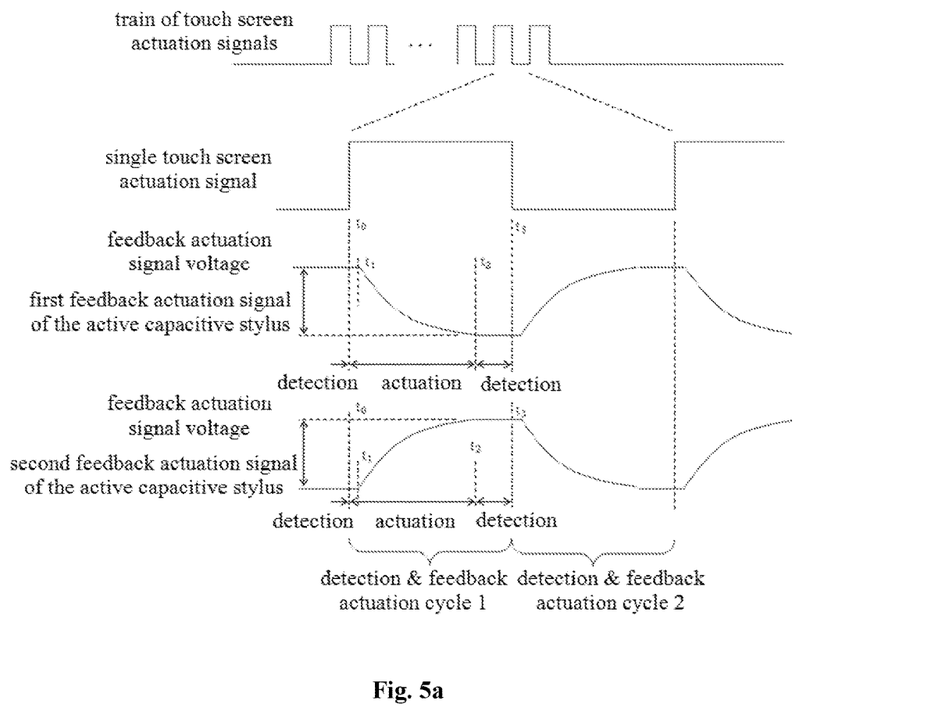
FIGS. 5a to 5c are diagrams showing temporal sequences of a touch-screen actuation signal and feedback actuation signals of the active capacitive stylus in accordance with preferred embodiments of the present invention.
Figure 5B:
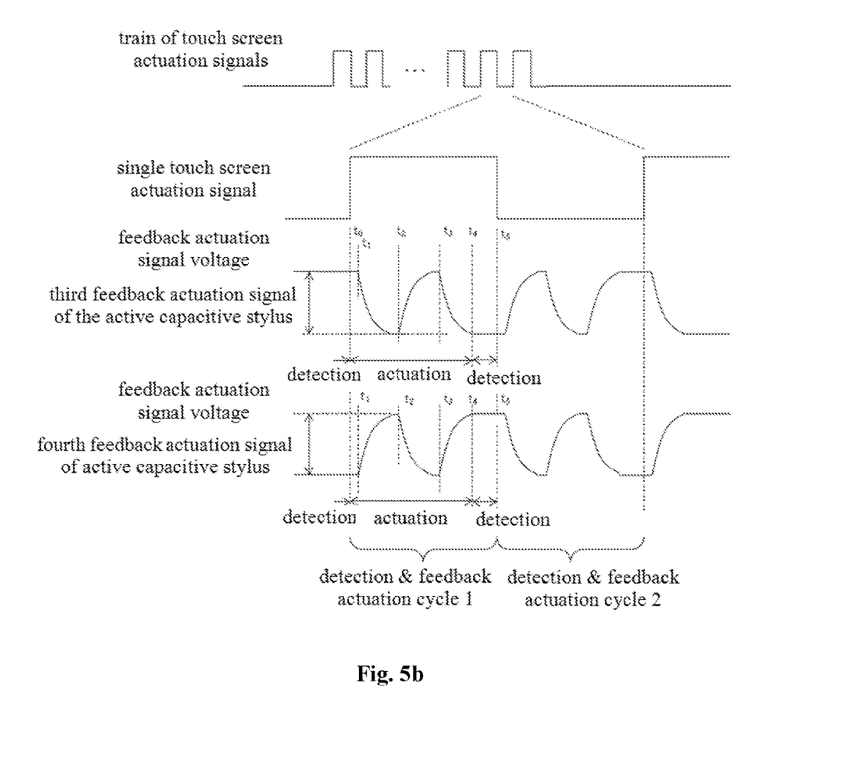
Figure 5C:
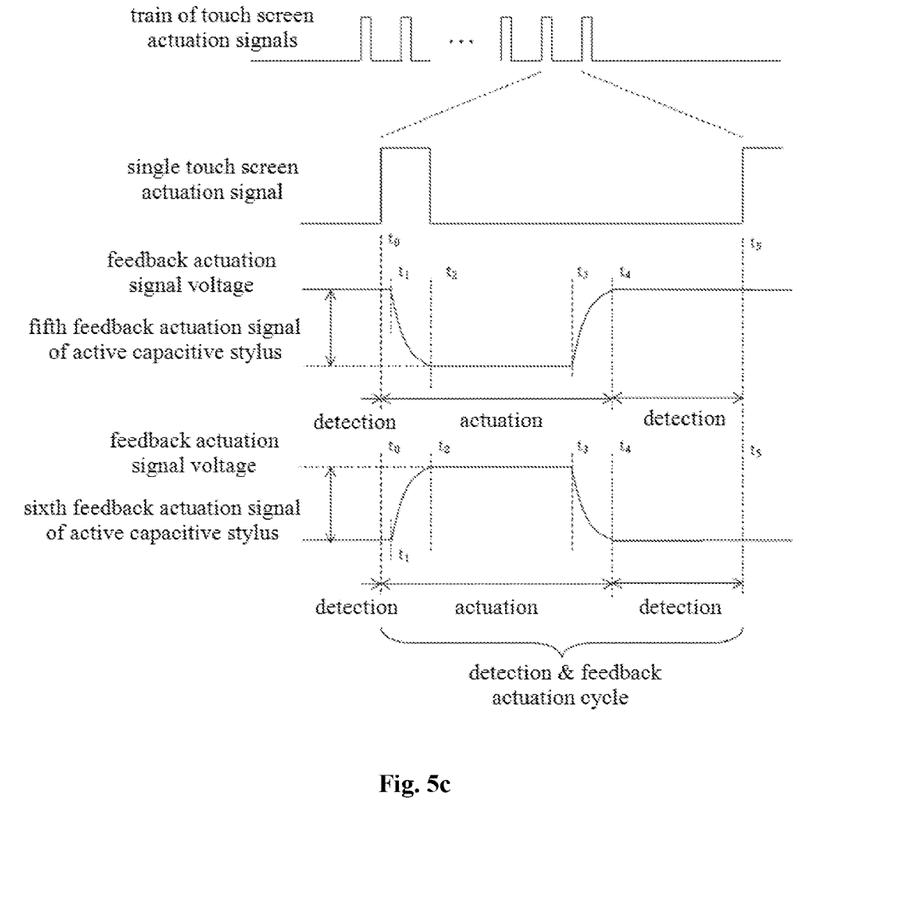

FIGS. 5a to 5c are diagrams showing temporal sequences of a touch-screen actuation signal and feedback actuation signals of an active capacitive stylus in accordance with preferred embodiments of the present invention. A process of detection and feedback actuation of the signal processing module of the active capacitive stylus will be described below in detail with reference to FIGS. 5a to 5c.

As shown in FIG. 5a, during its use, the active capacitive stylus may be brought near to or brought into contact with the touch screen. The touch screen controller may successively scan the actuation electrodes of the touch screen one by one. During the scanning of each one of the actuation electrodes, the controller may deliver a train of touch-screen actuation signals (as shown in FIG. 5a, in a first waveform). In this embodiment, the actuation signals are a train of pulses. However, the actuation signals may also be a train of triangular or sinusoidal waves. If an electrode of the touch screen to be actuated is distant from the conductive tip of the active capacitive stylus, the conductive tip will couple a touch-screen actuation signal that is too weak to be detected by the active capacitive stylus. On the contrary, when the touch screen controller actuates an actuation electrode in proximity of the conductive tip, the conductive tip is capable of coupling a strong touch-screen actuation signal which is then further coupled via the capacitor C (FIG. 3) to the input of the signal processing module 30 of the active capacitive stylus, i.e., the input of the detection circuitry 301. Upon detection of the touch-screen actuation signal, the detection circuitry 301 may output the detected signal to the control circuitry 302 of the signal processing module of the active capacitive stylus. The control circuitry 302 may then control the feedback actuation circuitry 303 to deliver a feedback actuation signal (e.g., those in the third and fourth waveforms in FIG. 5a) toward the touch screen.

The second waveform in FIG. 5a represents one signal in a train of touch-screen actuation signals from the touch screen. This touch-screen actuation signal has a high level and a low level. Upon the touch-screen actuation signal shifting from the low level to the high level at $t_0$, a corresponding actuation electrode of the touch screen positively charges all the detection electrodes of the touch screen via the coupling capacitors formed between the actuation electrode and the detection electrodes, i.e., increasing the voltages at the detection electrodes of the touch screen. On the other hand, upon the actuation signal dropping from the high level to the low level at $t_3$, the corresponding actuation electrode of the touch screen negatively charges all the detection electrodes of the touch screen, i.e., reducing the voltages of the detection electrodes of the touch screen. The detection electrodes of the touch screen start to discharge after each cycle of positive and negative charging. The touch screen controller may monitor the discharging of the detection electrodes and determine whether there are changes in the coupling capacitors between the actuation and detection electrodes, thereby further determining whether there is a conductive object in the vicinity.

The third and fourth waveforms in FIG. 5a are representative of feedback actuation signals of the active capacitive stylus corresponding to the touch-screen actuation signal of the second waveform. As indicated by the third and fourth waveforms, the signal processing module of the active capacitive stylus may be in the detection state at the beginning. At this time, the feedback actuation circuitry 303 may provide a high impedance output, thus floating the conductive tip so as to allow the conductive tip to sense the actuation signal delivered by the touch screen controller towards the corresponding actuation electrode of the touch screen. Upon the detection circuitry 301 of the active capacitive stylus detecting ($t_0$) an ascending edge of the touch-screen actuation signal, the detection circuitry 301 may output a signal to notify the control circuitry 302 about the detected ascending edge of the touch-screen actuation signal. The control circuitry 302 may responsively control the active capacitive stylus to switch to the feedback actuation state. In this state, the control circuitry 302 may determine, according to settings, to terminate ($t_1$) the high impedance output of the feedback actuation circuitry 303 after a certain delay, and to deliver a delayed forward (e.g., the third waveform of FIG. 5a) or reverse (e.g., the fourth waveform of FIG. 5a) feedback actuation signal with a certain slope ($t_1$ to $t_2$) toward the touch screen. In addition, the start time ($t_1$ in FIG. 5a) and the end time ($t_2$ in FIG. 5a), a delay of the ascending or descending edge ($t_1$ to $t_2$ in FIG. 5a), and the voltage, of the feedback actuation signal, may also be adjustable according to the settings. The whole process of feedback actuation by the active capacitive stylus with respect to the touch screen may end before the next descending edge ($t_3$ in FIG. 5a) of the touch-screen actuation signal. Then, the active capacitive stylus may enter again the detection state. The detection and feedback actuation cycle of the signal processing module 30 of the active capacitive stylus lasts from $t_0$ to $t_3$.

Strength of the feedback actuation signal of the active capacitive stylus may be adjusted by modifying the start time and end time, delays of the ascending and descending edges or voltage, or by modifying a delay of an ascending edge relative to a descending edge or a delay of a descending edge relative to an ascending edge, in the same detection and feedback actuation cycle.

Referring to FIG. 5b, as indicated by the third and fourth waveforms in FIG. 5b, the signal processing module of the active capacitive stylus may be in the detection state at the beginning. At this time, the feedback actuation circuitry 303 may provide a high impedance output, thereby floating the conductive tip so as to allow the conductive tip to sense the actuation signal delivered by the touch screen controller towards the corresponding actuation electrode of the touch screen. Upon the detection circuitry 301 of the active capacitive stylus detecting ($t_0$) an ascending edge of the touch-screen actuation signal, the detection circuitry 301 may output a signal to notify the control circuitry 302 about the detected ascending edge of the touch-screen actuation signal. The control circuitry 302 may responsively control the active capacitive stylus to switch to the feedback actuation state. In this state, the control circuitry 302 may determine, according to settings, to terminate ($t_1$) the high impedance output of the feedback actuation circuitry 303 after a certain delay, and to deliver toward the touch screen N delayed ascending or descending edges having a certain rising or falling slope and the same phase as the detected ascending or descending edge, as well as N+1 delayed ascending or descending edges having a certain rising or falling slope and the reverse phase with respect to the detected ascending or descending edge (e.g., the fourth waveform of FIG. 5b). Strength of the feedback actuation signal may be adjusted by modifying $t_2$, $t_3$ and $t_4$. The whole feedback actuation process may end before the next descending edge ($t_5$ in FIG. 5b) of the touch-screen actuation signal. The detection and feedback actuation cycle of the signal processing module 30 of the active capacitive stylus lasts from $t_0$ to $t_5$.

FIG. 5c illustrates another touch-screen actuation signal. The first waveform in FIG. 5c represents a train of touch screen actuation waves, while the second waveform represents a single touch-screen actuation signal. This single touch-screen actuation signal similarly has a high level and a low level, but differs from those shown in FIGS. 5a and 5b associated with the touch screen controller charging the detection electrodes via the coupling capacitors both at the high and low levels in a single touch screen actuation wave cycle in using a switch to charge the detection electrodes only once, positively or negatively, in a single touch screen actuation wave cycle. During its use, the active capacitive stylus may be brought near to or into contact with the touch screen. When the touch screen controller actuates an actuation electrode in proximity of the conductive tip, the conductive tip can couple a touch-screen actuation signal. The control circuitry 302 of the active capacitive stylus may determine, according to settings, to terminate ($t_1$ in FIG. 5c) a high impedance output of the feedback actuation circuitry 303 after a certain delay, and to deliver toward the touch screen a delayed ($t_1$ to $t_2$ in FIG. 5c) reverse feedback actuation signal with a certain falling slope (e.g., the third waveform of FIG. 5c) or a delayed ($t_1$ to $t_2$ in FIG. 5c) forward feedback actuation signal with a certain rising slope (e.g., the fourth waveform of FIG. 5c). The start time ($t_1$ in FIG. 5c) and the end time ($t_2$ in FIG. 5c), as well as the voltage, of the feedback actuation signal may be adjustable according to the settings. The whole feedback actuation process may end before the arrival of an ascending edge ($t_5$ in FIG. 5c) of the next actuation signal from the touch screen. Then, the active capacitive stylus may accordingly enter again the detection state. The detection and feedback actuation cycle of the signal processing module of the active capacitive stylus lasts from $t_0$ to $t_5$.

Figure 6:
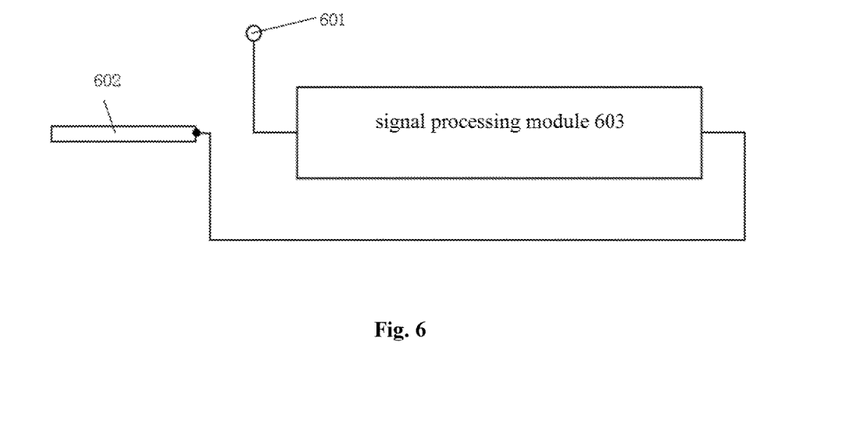
FIG. 6 illustrates the interior of a second preferred embodiment of the active capacitive stylus according to the present invention.

FIG. 6 illustrates the interior of a second preferred embodiment of the active capacitive stylus according to the present invention. As illustrated in FIG. 6, in the second preferred embodiment of the present invention, the active capacitive stylus according to the present invention includes a detection electrode 601, an actuation electrode 602 and a signal processing module 603. The detection electrode 601 is configured to sense a touch-screen actuation signal from a touch screen and transfer the signal to the signal processing module 603. The signal processing module 603 is configured to process the touch-screen actuation signal received by the detection electrode 601 and synchronously generate a feedback actuation signal. The feedback actuation signal is transmitted by the actuation electrode 602 toward the touch screen, in order to achieve accurate position determination with the aid of a position determination algorithm deployed in the touch screen. In this embodiment, the actuation electrode may be implemented as a conductive tip, and the detection electrode 601 as a conductive head, a conductive body, a PCB trace, or a conductive metal wire. The signal processing module 603 is structurally and functionally similar to the signal processing module of the first preferred embodiment, and a detailed description thereof will be omitted herein.

Figure 7:
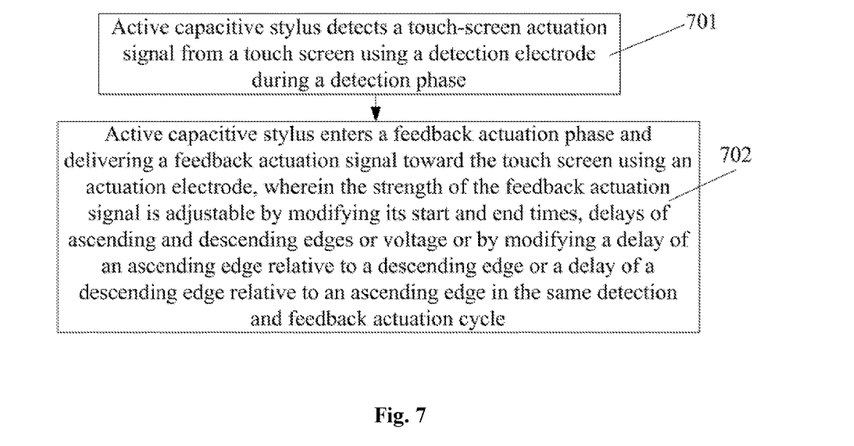
FIG. 7 is a flow diagram graphically showing steps of a method for touch detection and feedback actuation of an active capacitive stylus according to the present invention.

FIG. 7 illustrates a first preferred embodiment of a method for touch detection and feedback actuation of an active capacitive stylus according to the present invention. As shown in FIG. 7, the method for touch detection and feedback actuation of an active capacitive stylus according to the present invention includes the following steps:

In step 701, the active capacitive stylus detects a touch-screen actuation signal from a touch screen using a detection electrode at a detection phase of a detection and feedback actuation cycle.

In step 702, after detecting the touch-screen actuation signal, the active capacitive stylus delivers a feedback actuation signal toward the touch screen using an actuation electrode and enters a feedback actuation phase of the detection and feedback actuation cycle. Strength of the feedback actuation signal may be adjusted by modifying the start time and end time, delays of ascending and descending edges or voltage, or by modifying a delay of an ascending edge relative to a descending edge or a delay of a descending edge relative to an ascending edge, in the same detection and feedback actuation cycle. The feedback actuation phase may end before an ascending or descending edge of the next touch-screen actuation signal. During the feedback actuation, an output of the detection circuitry of the active capacitive stylus may be ignored.

Reference can be made also to the temporal sequence shown in FIG. 5a for the above-described feedback actuation process. As the temporal sequence of FIG. 5a has been described in detail above, a detailed description thereof will be omitted herein.

In a second preferred embodiment of the method for touch detection and feedback actuation of an active capacitive stylus according to the present invention, in step 702, after detecting the touch-screen actuation signal, the active capacitive stylus delivers a feedback actuation signal toward the touch screen using the actuation electrode of the stylus and enters the feedback actuation phase. The feedback actuation signal may be a single ascending or descending edge having the reverse phase with respect to, or the same phase as, the touch-screen actuation signal, or ascending or descending edges of N touch-screen actuation signals having the same phase and N+1 touch-screen actuation signals having the reverse phase, or ascending or descending edges of N touch-screen actuation signals having the reverse phase and N+1 touch-screen actuation signals having the same phase, where N is a natural number. During the feedback actuation, the output of the detection circuitry of the active capacitive stylus may be ignored. Reference can be made to FIG. 5b for detail temporal sequences.

In step 702, if the feedback actuation signal contains more than one ascending or descending edge in a single detection and feedback actuation cycle, the strength of the feedback actuation signal may be adjusted by modifying a delay of an ascending edge relative to a descending edge or a delay of a descending edge relative to an ascending edge. The feedback actuation signal may be configured to end before an ascending or descending edge of the next touch-screen actuation signal.

To sum up, by separating the detection circuitry from the feedback actuation circuitry in terms of temporal sequence, the active capacitive stylus and method for its touch detection and actuation according to the present invention effectively prevent the signal processing module from forming a closed loop which may cause self-excited oscillation therein. Therefore, the position of the conductive tip of the active capacitive stylus can be accurately determined, and it is more easily identifiable whether the conductive object is a finger or the active capacitive stylus. Meanwhile, the active capacitive stylus according to the present invention further enables delivery of feedback actuation signals of different strengths according to settings.

The foregoing embodiments are presented merely as illustrative of the principles and benefits of the present invention and are not to be construed as limiting the same. Any person skilled in the art can make modifications or changes to the disclosed embodiments without departing from the spirit and scope of the present invention. Accordingly, the scope of the invention as claimed is defined by the claims.

What is claimed is:

1. An active capacitive stylus, comprising a conductive tip, a signal processing module and a capacitor, the conductive tip configured to detect a touch-screen actuation signal from a touch screen and to transfer a feedback actuation signal output from the signal processing module, the signal processing module configured to process the touch-screen actuation signal received by the conductive tip and to synchronously produce the feedback actuation signal, the capacitor disposed between the conductive tip and the signal processing module and configured to couple the touch-screen actuation signal obtained by the conductive tip to an input of the signal processing module during the detection and to isolate the feedback actuation signal during the feedback actuation of the touch screen, wherein the signal processing module comprises:
a detection circuitry, configured to detect an ascending or descending edge of the touch-screen actuation signal from the touch screen;
a control circuitry, configured to control the signal processing module to switch from a detection state to a feedback actuation state in response to the detection circuitry having detected the ascending or descending edge of the touch-screen actuation signal from the touch screen and to adjust a start time and an end time of the feedback actuation signal, a delay of an ascending or a descending edge of the feedback actuation signal or a voltage of the feedback actuation signal, according to settings such that the feedback actuation signal ends prior to arrival of an ascending or descending edge of a next touch-screen actuation signal, thereby causing the signal processing module to switch from the feedback actuation state again to the detection state; and
a feedback actuation circuitry, configured to provide a tri-stated high impedance output during the detection for floating the conductive tip and to transfer the feedback actuation signal to the conductive tip under control of the control circuitry during the actuation so as to enable feedback actuation of the touch screen, and wherein the signal processing module further comprises a protective circuitry consisting of two or more diodes connected in opposing parallel relation, the protective circuitry having a first end coupled to a constant bias voltage and a second end coupled to the input of the detection circuitry.

2. The active capacitive stylus according to claim 1, further comprising an auxiliary detection electrode disposed at the input of the signal processing module and configured to increase an ability of the active capacitive stylus to detect the touch-screen actuation signal.

* * * * *